US012625828B2

(12) United States Patent
Segev et al.

(10) Patent No.: US 12,625,828 B2
(45) Date of Patent: May 12, 2026

(54) NVMe COMPLETION AND INTERRUPT

(71) Applicant: Sandisk Technologies, Inc., Milpitas, CA (US)

(72) Inventors: Amir Segev, Meiter (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 13 days.

(21) Appl. No.: 18/522,514

(22) Filed: Nov. 29, 2023

(65) Prior Publication Data

US 2025/0173283 A1     May 29, 2025

(51) Int. Cl.
G06F 13/16 (2006.01)

(52) U.S. Cl.
CPC .................................. G06F 13/1673 (2013.01)

(58) Field of Classification Search
CPC .................................................. G06F 13/1673
USPC .......................................................... 710/22
See application file for complete search history.

(56) References Cited

U.S. PATENT DOCUMENTS

| 8,554,968 B1 * | 10/2013 | Onufryk | .................. G06F 13/24 |
| | | | 710/48 |
| 9,128,920 B2 | 9/2015 | Ning et al. | |
| 9,684,613 B2 | 6/2017 | Patwa et al. | |
| 9,898,427 B2 * | 2/2018 | Bergsten | ............. G06F 13/4022 |
| 9,965,412 B2 | 5/2018 | Liu et al. | |
| 10,466,903 B2 | 11/2019 | Benisty et al. | |
| 11,068,422 B1 | 7/2021 | Tai et al. | |

| 2011/0093637 A1 * | 4/2011 | Gupta | ..................... G06F 13/24 |
| | | | 710/263 |
| 2014/0207980 A1 * | 7/2014 | Tsurumi | .............. G06F 13/1642 |
| | | | 710/54 |
| 2015/0281126 A1 * | 10/2015 | Regula | .................... H04L 67/55 |
| | | | 709/212 |
| 2016/0026388 A1 * | 1/2016 | Jeong | ..................... G06F 3/061 |
| | | | 711/112 |

(Continued)

FOREIGN PATENT DOCUMENTS

| CN | 116225992 A | 6/2023 |
| CN | 117093517 A | 11/2023 |

OTHER PUBLICATIONS

International Search Report and Written Opinion for Application No. PCT/US2024/039932 dated Nov. 13, 2024.

*Primary Examiner* — Titus Wong
(74) *Attorney, Agent, or Firm* — Patterson + Sheridan, LLP

(57) ABSTRACT

Instead of having uncertainty when waiting on completions, utilize unordered input output memory write (UIOMWr) to ensure the completions of the write. Using UIOMWr, the data storage device will write the competitions to a host dynamic random access memory (DRAM). When the device receives an approval of the completion, the device knows that the write to the host DRAM was successful. The approval will trigger the device to have the message signaled interrupts extended (MSIx) send an interrupt request (IRQ) to the host. The IRQ will pass through the PCIe and will be received by the host CPU. The host CPU will then process any pending completions in the host DRAM. An MSIx tag can be added to the completion (at the UIOMWr TLP level) that is assigned to multiple submission queues (SQ). When the MSIx tag is received by the host and device, the host and device will know what information needs to be pulled to avoid the need for translation later on.

17 Claims, 7 Drawing Sheets

(56)          References Cited

U.S. PATENT DOCUMENTS

| | | | |
|---|---|---|---|
| 2016/0132237 A1* | 5/2016 | Jeong | G06F 3/061 |
| | | | 711/103 |
| 2017/0017516 A1* | 1/2017 | Sato | G06F 13/22 |
| 2018/0113615 A1 | 4/2018 | Park | |
| 2018/0275872 A1 | 9/2018 | Benisty et al. | |
| 2019/0146684 A1* | 5/2019 | Benisty | G06F 13/4282 |
| | | | 711/102 |
| 2019/0317696 A1* | 10/2019 | Jagadish | G06F 3/0679 |
| 2020/0012451 A1 | 1/2020 | Benisty | |
| 2020/0065264 A1* | 2/2020 | Gissin | G06F 3/061 |
| 2021/0042039 A1* | 2/2021 | Benisty | G06F 13/20 |
| 2021/0049120 A1* | 2/2021 | Cha | G06F 3/0688 |
| 2022/0027292 A1* | 1/2022 | Gissin | G06F 3/061 |

\* cited by examiner

| Row Pass Column? | Posted Request (Col 2) | Non-Posted Request | | Completion (Col 5) |
| --- | --- | --- | --- | --- |
| | | Read Request (Col 3) | NPR with Data (Col 4) | |
| Posted Request (Row A) | a) No b) Y/N | Yes | Yes | a) Y/N b) Yes |
| Non-Posted Request — Read Request (Row B) | a) No b) Y/N | Y/N | Y/N | Y/N |
| Non-Posted Request — NPR with Data (Row C) | a) No b) Y/N | Y/N | Y/N | Y/N |

Send NVMe
completion to host
device with MSIx tag
502

Receive PCIe
completion from host
device with MSIx tag
504

Instruct MSIx to send
interrupt to host
device
506

MSIx sends interrupt
to host device
508

NVMe COMPLETION AND INTERRUPT

BACKGROUND OF THE DISCLOSURE

Field of the Disclosure

Embodiments of the present disclosure generally relate to improving completion recognition in solid state drives (SSD).

Description of the Related Art

SSD non-volatile memory express (NVMe) devices, use a completion queue to report a success or a failure of command. Once the completion information is written in the completion queue, the host receives an interrupt via the message signaled interrupts extended (MSIx) to inform the host, that the host has completions to manage. Usually with the presence of completions and interrupts, the data storage device would send the completion to the host. Once the completion is sent, the data storage device would then send the interrupt to the MSIx.

Once the host receives the interrupt, the host will go and decide whether to read the completion entry or not. The peripheral component interconnect express (PCIe) guarantees the order of completion. Writing the completion will be finished first before writing the interrupt, the finishing ends at the PCIe controller ensuring that there are no bypass at the PCIe level. A completion typically goes to a dynamic random access memory (DRAM), and MSIx typically goes to the PCIe. If the CPU doesn't receive the interrupt, then the CPU will check again for the interrupt at a predetermined time. After sending the completion, sometime later the host is expected to say the completion was received so the data storage device knows the host did receive the completion. If a completion is not notified to the data storage device, then the data storage device will resend the interrupt as a check.

The host could back-pressure any MSIx (and following memory write (MemWr)) until the PCIe to DRAM path is empty, but that will cause performance degradation. Alternatively, the data storage device could hold a time-out mechanism and if the data storage device sees the completions have not been approved, the data storage device will re-issue the MSIx, but such a procedure is not efficient.

Therefore, there is a need in the art for improving completion notifications between the host and the data storage device.

SUMMARY OF THE DISCLOSURE

Instead of having uncertainty when waiting on completions, utilize unordered input output memory write (UIOMWr) to ensure the completions of the write. Using UIOMWr, the data storage device will write the competitions to a host dynamic random access memory (DRAM). When the device receives an approval of the completion, the device knows that the write to the host DRAM was successful. The approval will trigger the device to have the message signaled interrupts extended (MSIx) send an interrupt request (IRQ) to the host. The IRQ will pass through the PCIe and will be received by the host CPU. The host CPU will then process any pending completions in the host DRAM. An MSIx tag can be added to the completion (at the UIOMWr TLP level) that is assigned to multiple submission queues (SQ). When the MSIx tag is received by the host and device, the host and device will know what information needs to be pulled to avoid the need for translation later on.

In one embodiment, a data storage device comprises: a memory device; and a controller coupled to the memory device, wherein the controller is configured to: send a nonvolatile memory express (NVMe) completion to a host device, wherein the NVMe completion has a tag; receive a peripheral component interconnect express (PCIe) completion from the host device, wherein the PCIe completion has the tag; and send an interrupt to the host device.

In another embodiment, a data storage device comprises: a memory device; and a controller coupled to the memory device, wherein the controller is configured to: send a first device completion notification to a completion queue of a host device; send a second device completion notification to the completion queue of the host device, wherein the second device completion notification is sent prior to receiving a first host completion notification from the host device for the first device completion notification; and send an interrupt to the host device, wherein the interrupt is sent after receiving a second host completion notification from the host device for the second device completion notification.

In another embodiment, a data storage device comprises: means to store data; and a controller coupled to the means to store data, wherein the controller is configured to: send multiple transaction layer packets (TLPs) to a completion queue of a host device, wherein a last TLP includes a uses unordered input output memory write (UIOMWr); and send an interrupt to the host device after receiving an acknowledgement of the last TLP.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 is a block diagram illustrating a table displaying ordering rules, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Instead of having uncertainty when waiting on completions, utilize unordered input output memory write (UIOMWr) to ensure the completions of the write. Using UIOMWr, the data storage device will write the competitions to a host dynamic random access memory (DRAM). When the device receives an approval of the completion, the device knows that the write to the host DRAM was successful. The approval will trigger the device to have the message signaled interrupts extended (MSIx) send an interrupt request (IRQ) to the host. The IRQ will pass through the PCIe and will be received by the host CPU. The host CPU will then process any pending completions in the host DRAM. An MSIx tag can be added to the completion (at the UIOMWr TLP level) that is assigned to multiple submission queues (SQ). When the MSIx tag is received by the host and device, the host and device will know what information needs to be pulled to avoid the need for translation later on.

Figure 1:
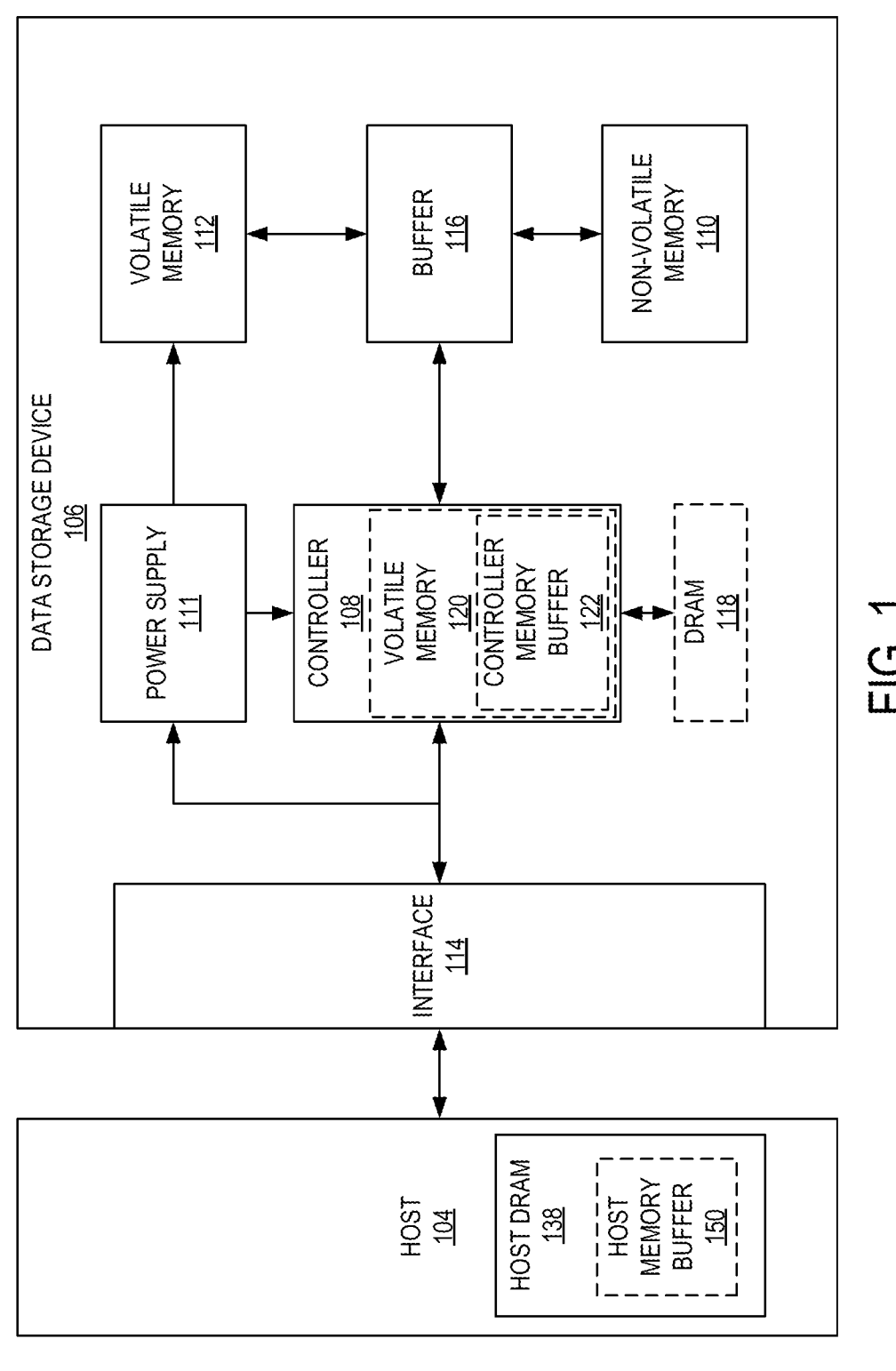
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where controller 108 accesses the CMB 122 in order to retrieve the stored generated commands and/or associated data.

Figure 2:
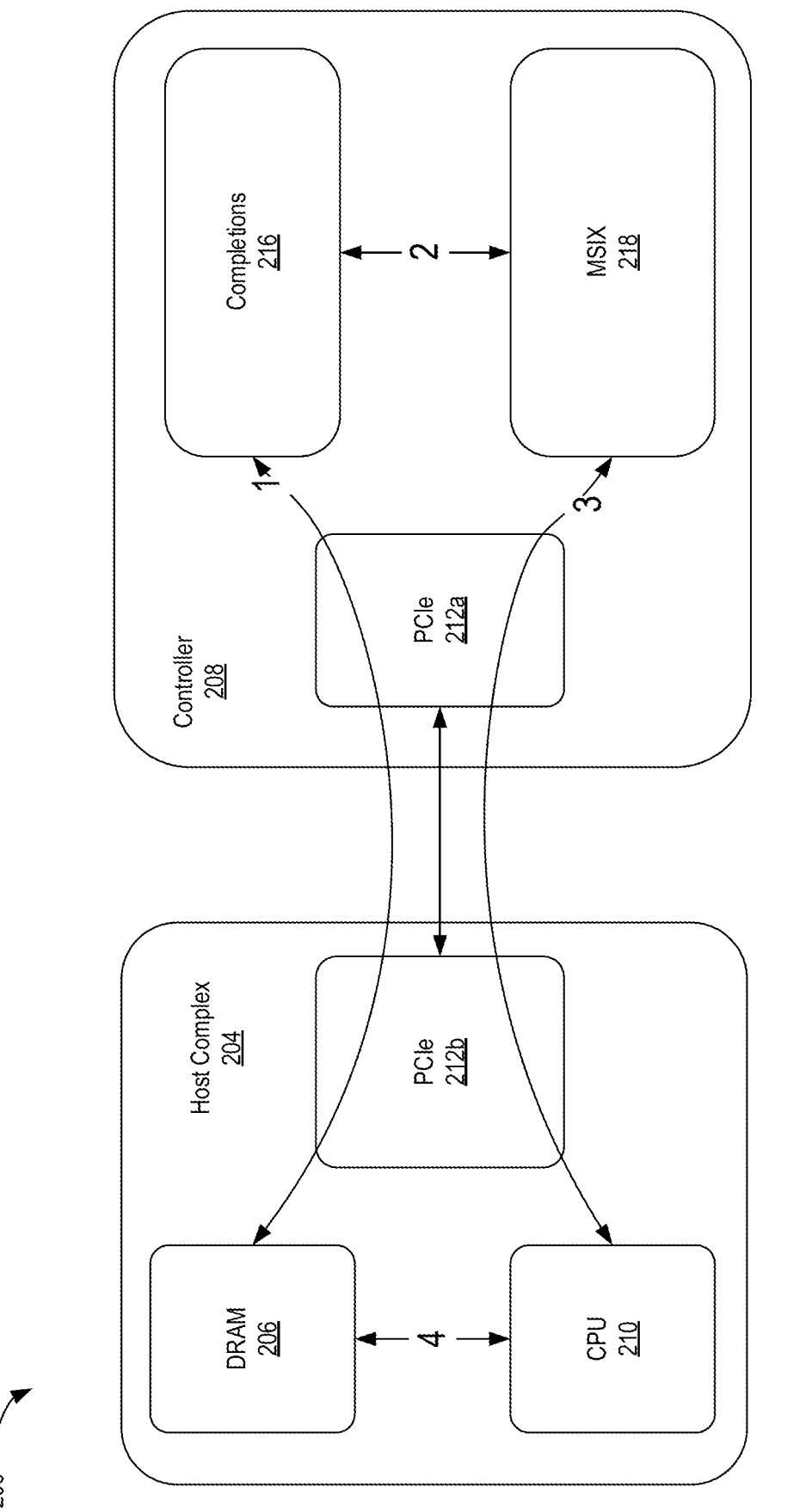
FIG. 2 is a block diagram illustrating a system running a completion flow, according to one embodiment.

FIG. 2 is a block diagram illustrating a system 200 running a completion flow, according to one embodiment. On the controller side in step (1), the controller 208 holds logic to handle sending completions to the host complex 204. After doing so, in step (2), the completions 216 will inform the MSIx 218 to send a relevant MSIx logic. At step (3), the controller 208 will send the MSIx logic through the PCIe 212a,b.

On the host complex 204 side in step (1), completions are written to the host DRAM 206. Later in step (3), the MSIx logic reaches the host CPU 210. At step (4), the MSIx logic reaching the host CPU 210 causes the host complex 204 to process the completion from the controller 208 DRAM.

FIG. 3 is a block diagram illustrating a table 300 displaying ordering rules, according to one embodiment. The PCIe has a way to ensure that written data does not bypass other written data (posted request is memory write (MemWr)). As such, the PCIe is insured that the completion will reach the host before the MSIx does. However, since the path from the host to the DRAM and to the CPU is different, the host might get the MSIx (interrupt request (IRQ)) before the completion is written in the DRAM. When the CPU comes to process the completion, the CPU might find none. While this is a rare case, this case does happen. As will be discussed herein, the rare case can be avoided.

Figure 4:
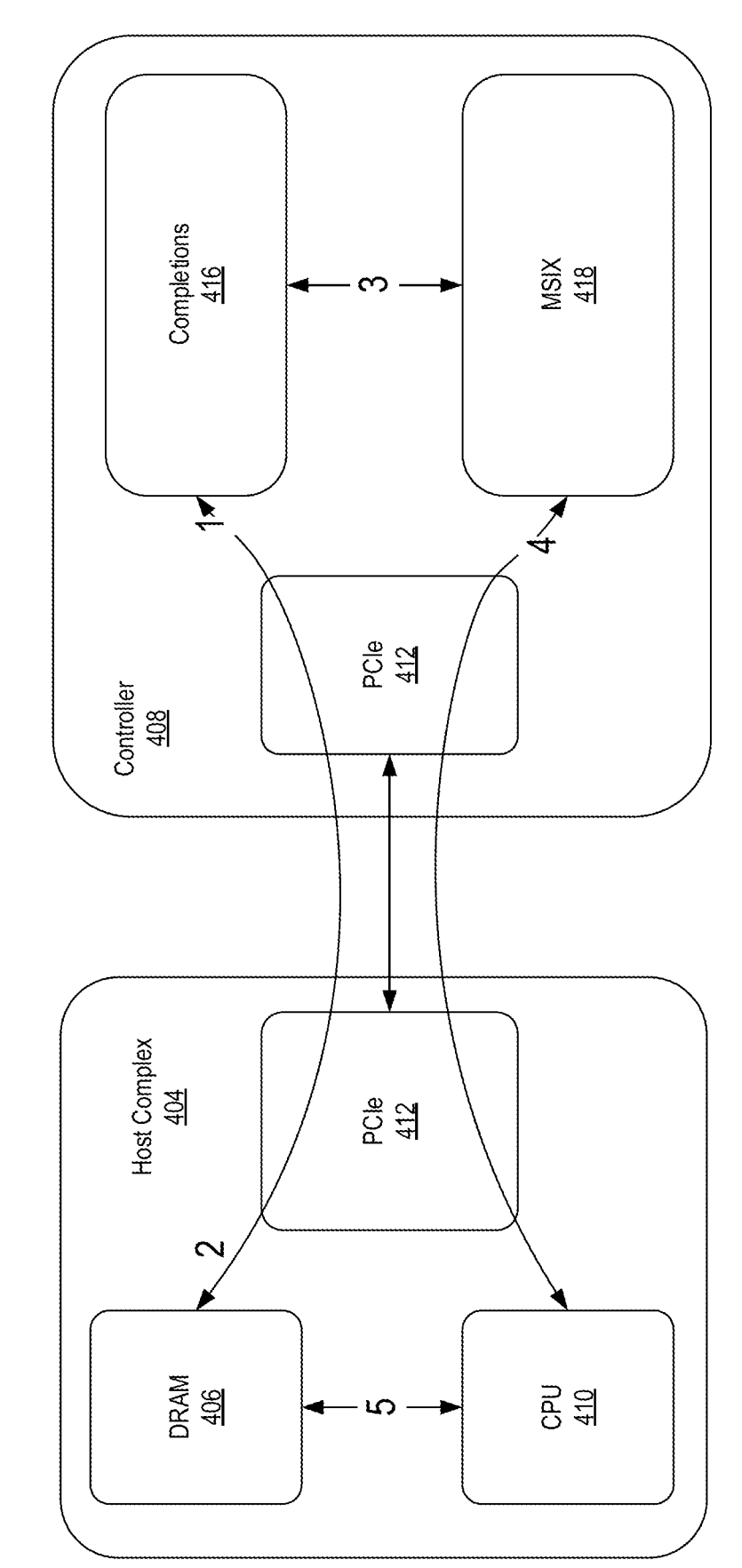
FIG. 4 is a block diagram illustrating a system running an upgraded completion flow, according to one embodiment.

FIG. 4 is a block diagram illustrating a system 400 running an upgraded completion flow, according to one embodiment. Using the unordered input output memory write (UIOMWr), the device is able to wait for the completion of the write. The device will send an NVMe completion, and the host should send a PCIe completion of the request when the completion is safe in a designated destination. The response of the completion is used to determine if the interrupt should be written.

Using what is essentially non-posted writes, use the non-posted writes for sending completions to the host, followed by the MSIx once the completion is fully written. After the data transfer phase of a command has been completed, the device in step (1), is using UIOMWr to write the completions 416 to the host DRAM 406. At step (2), the device receives an approval that the data has been successfully written to host DRAM 406. The completions 416 at step (3), will instruct the MSIx 418 to send an IRQ to the host complex 404. At step (4), the device will send the IRQ through the PCIe 412a,b, to the host CPU 410. At step (5), after receiving the IRQ, the host CPU 410 will access the host DRAM 406 to process the pending completions 414. After (2), but before (3), the host will have visibility to the PCIe completion. As such, there are two completions: NVMe from the data storage device, and a PCIe from the host with a tag sent with both completions. It is the response at (2) that allows the device to know when to send the IRQ.

Figure 5:
FIG. 5 is a flowchart illustrating a method for MSIx tag utilization, according to certain embodiments.
Figure 5:
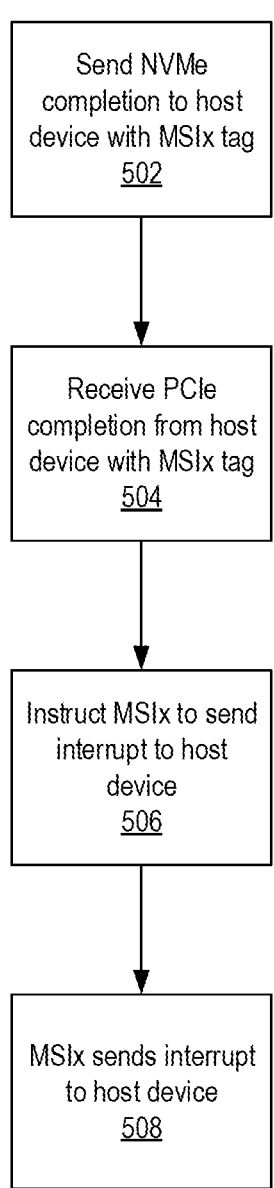

FIG. 5 is a flowchart illustrating a method 500 for MSIx tag utilization, according to certain embodiments. The write to the device can have an MSIx tag so when the NVMe completion is sent to the host, the same MSIx tag will be used when the PCIe completion is sent to device once the completion is in a secured destination.

The utilization of the MSIx tag is for calling multiple completion queues (CQ) to a single MSIx tag. When the host ask the device to create a completion queue (CQ), it informs the device which MSIX to associate it with. As such the UIOWR tag can be used as follows. For example $MSIX_1$ tag will be assigned to CQ1 and $MSIX_2$ tag will be assigned to CQ2. Another option is for the MSIX tag to be assigned the same to multiple CQs. For example the $MSIX_1$ tag will be assigned to both CQ1 and CQ2, in case the host configured both CQs to use the same MSIX. The use of the MSIX tag in the second manner avoids the need to do translation later on. This is due to when a response is received that a completion is safely written, the response will have an information of what MSIX to send.

Issuing multiple UIOMWrs with the same tag value is possible. The current approach suggests to use the MSIX tag to hold the value of the MSIX index. This allows for the device to send a completion to a CQ associated with MSIXa the "a" will be coded into the MSIXa tag instead of the "x".

Whenever the device sends a completion to CQa, the device will increase the MSIXa counter. If a different CQ, (i.e. CQy) is using the same MSIXa, the device will use the same counter (MSIXa-counter). When a completion (UIO-WrCpl) for "MSIXa tag" arrives, the count in the MSIXa-counter is decremented. If the value reaches zero, MSIXa is sent (steps 3, 4) occurs. This improvement also holds the benefit of holding less counters (per MSIx and not per SQ).

The method 500 begins at block 502. At block 502, the controller sends a NVMe completion to the host device with an MSIXx tag (at the UIOMWr TLP layer). At block 504, the controller receives a PCIe completion from the host device with the MSIXx tag. At block 506, the controller instructs the MSIXx to send the interrupt to the host device. At block 508, the MSIX IP sends MSIXx interrupt to host device.

Figure 6:
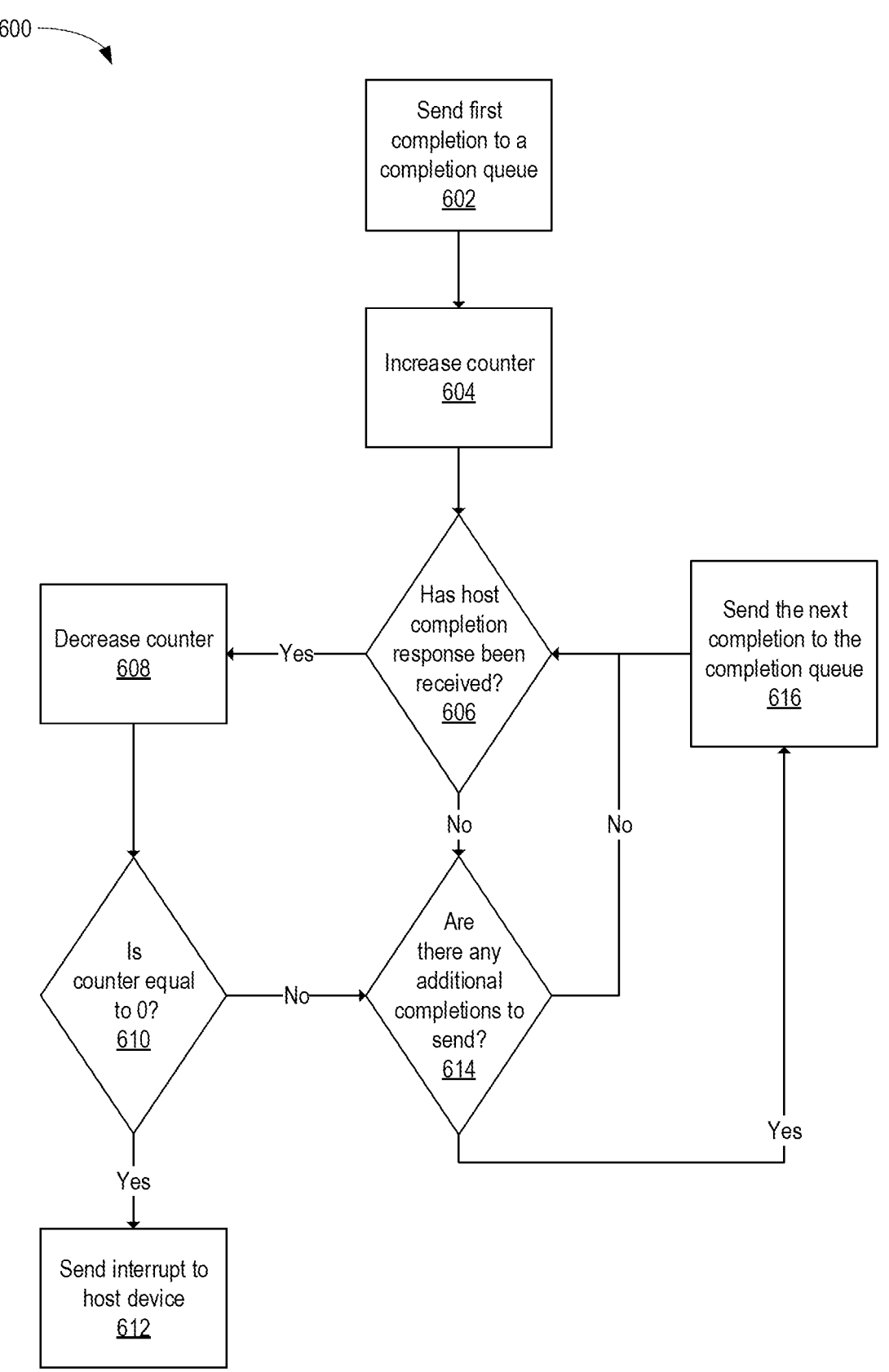
FIG. 6 is a flowchart illustrating a method for an interrupt coalescing affect, according to certain embodiments.

FIG. 6 is a flowchart illustrating a method 600 for an interrupt coalescing affect, according to certain embodiments. The method 600 holds an interrupt coalescing affect.

If two (or more) completions are sent, before receiving all required UIOWrCpl then a single IRQ/MSIx will be sent for all completions. Though the new approach is focused on the MSIX capability, the same functionality can work with all other interrupt methods (MSI and interrupt extended (INTx)).

In NVMe, there is an interrupt coalescing affect. The idea of the interrupt coalescing affect is when one interrupt is sent with multiple completions. Whenever a completion is sent to a given MSIX, the counter is increased and whenever a completion is received to the completion module the counter is decreased.

Again, the completion that is sent is important. When the counter reaches zero, the device knows that the single interrupt for all the completions was sent to the same MSIX.

In a different embodiment, an additional approach to achieving interrupt coalescing affect is instead of using counters, the device can send a first completion with a normal memory write and send the last completion with IO memory write. In this case the interrupt will be sent after the last completion, when the IOMemWr (PCIe completion) is received. The device does not need to use counters to achieve interrupt coalescing affect.

The method 600 begins at block 602. At block 602, the controller sends first completion to a completion queue. At block 604, the controller increases the counter. At block 606, the controller determines whether the host completion response has been received. If the controller determines that the host completion response has been received, then the method 600 will proceed to block 608. At block 608, the controller decrease the counter. At block 610, the controller determines whether the counter is equal to zero. If the controller determines that the counter is equal to zero, then the method 600 proceeds to block 612. At block 612, the controller sends interrupt to the host device.

If the controller determines that the host completion response has not been received, then the method 600 proceeds to block 614. At block 614, the controller determines whether there are any additional completions to send. If the controller determines that there are no additional completions to send, then the method 600 returns to block 606. If the controller determines that there are additional completions to send, then the method 600 proceeds to block 616. At block 616, the controller sends the next completion to the completion queue and the method 600 returns to block 606.

Figure 7:
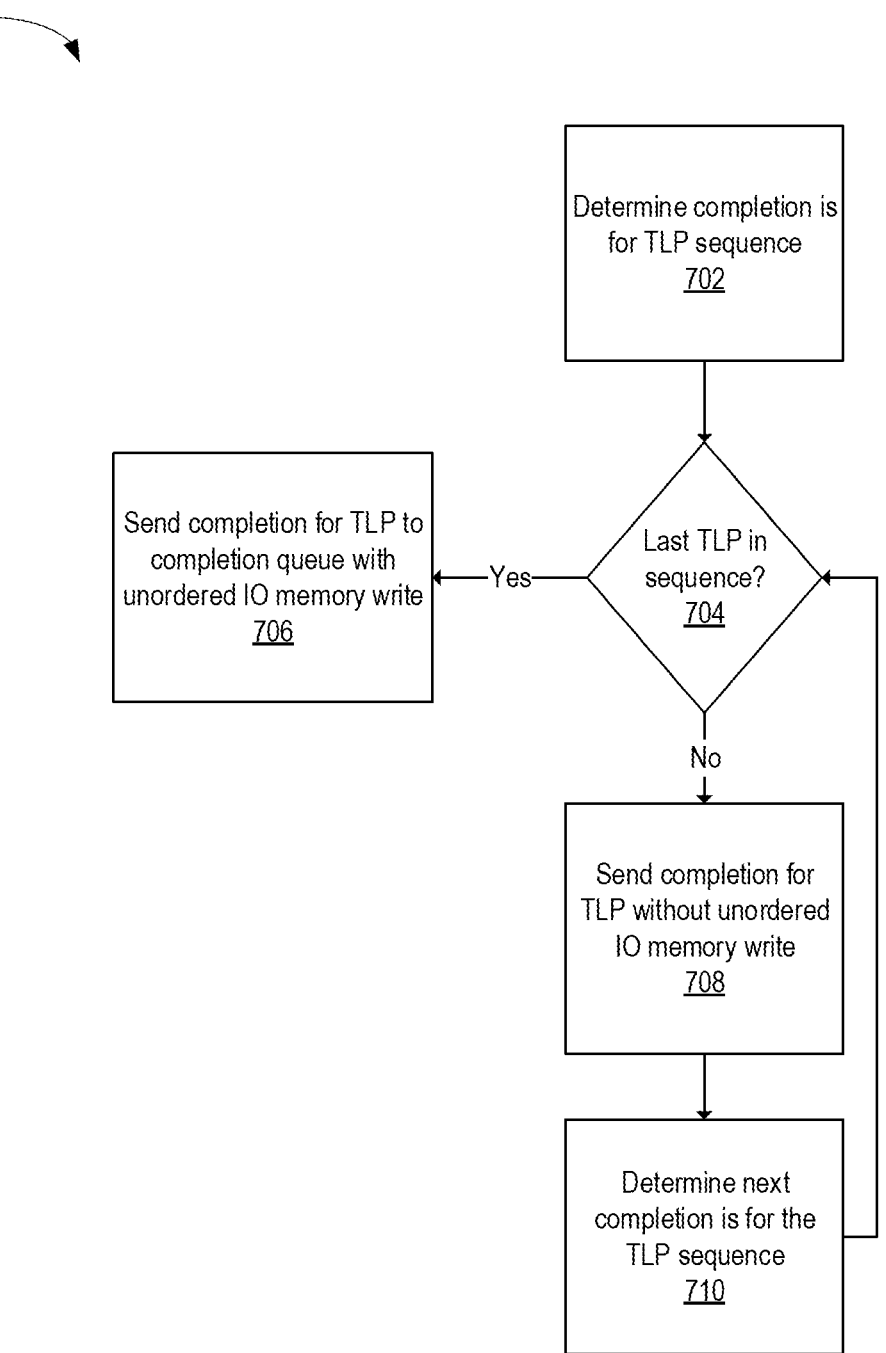
FIG. 7 is a flowchart illustrating a method for last transaction layer packet (TLP) unordered input output memory write (UIOMWr) utilization, according to certain embodiments.

FIG. 7 is a flowchart illustrating a method 700 for last TLP UIOMWr utilization, according to certain embodiments. The method 700 begins at block 702. At block 702, the controller determines that a completion is for a TLP sequence. A TLP sequence is considered multiple NVMe completions associated with the same MSIX index, where a sequence size (example 8) can be used to determine how many completions to coalesce before sending the MSIx. At block 704, the controller determines if the TLP is the last TLP in the sequence. If the controller determines that the TLP is the last TLP of the sequence, then the method 700 proceeds to block 706. At block 706, the controller sends a completion for TLP to the CQ with unordered IP memory write. If the controller determines that the TLP is not the last TLP in the sequence, then the method 700 proceeds to block 708. At block 708, the controller sends a completion for the TLP without unordered IO memory write. At block 710, the controller determines that the next completion is for the TLP sequence and returns to block 704.

The disclosure involves using UIOMWr to send completions so that the data storage device can track when it is safe to send the relevant MSIx. Doing so results in a coalescing effect. The advantage of UIOMWr utilization is that UIOMWr provides a more deterministic way to handle MSIx where race conditions cannot occur.

In one embodiment, a data storage device comprises: a memory device; and a controller coupled to the memory device, wherein the controller is configured to: send a nonvolatile memory express (NVMe) completion to a host device, wherein the NVMe completion has a tag; receive a peripheral component interconnect express (PCIe) completion from the host device, wherein the PCIe completion has the tag; and send an interrupt to the host device. The tag is an indication of which MSIX or MSI or INTx to utilize. The NVMe completion is for a first completion queue and the PCIe completion is for the first completion queue. The controller uses unordered input output memory write (UIOMWr) to write the NVMe completion. The controller is configured to send multiple UIOMWr completions with the same tag. The controller is configured to increase a counter when sending the NVMe completion. The controller is configured to decrease the counter when receiving the PCIe completion. The counters can be increased either never or every UIOMWr. The counters can be decreased either never or every PCIe completion. When the counters reach zero, an interrupt is sent.

The sending of an interrupt is performed when the counter reaches 0. The interrupt is sent after multiple PCIe completions have been received for a same completion queue. The controller is configured to send multiple NVMe completions to a same completion queue utilizing multiple transaction layer packets (TLPs). A last TLP uses unordered input output memory write (UIOMWr). Other TLPs of the multiple TLPs do not use UIOMWr. The controller can send the UIOMWr either with each NVMe completions or with every Xth (last TLP) completion.

In another embodiment, a data storage device comprises: a memory device; and a controller coupled to the memory device, wherein the controller is configured to: send a first device completion notification to a completion queue of a host device; send a second device completion notification to the completion queue of the host device, wherein the second device completion notification is sent prior to receiving a first host completion notification from the host device for the first device completion notification; and send an interrupt to the host device, wherein the interrupt is sent after receiving a second host completion notification from the host device for the second device completion notification. The interrupt is an MSIx interrupt, a MSI interrupt, or an INTx interrupt. The controller is further configured to maintain a counter for completion notifications. The counter is increased when sending a device completion notification, and wherein the counter is decreased when receiving a host completion notification. The interrupt is sent when the counter is 0.

In another embodiment, a data storage device comprises: means to store data; and a controller coupled to the means to store data, wherein the controller is configured to: send multiple transaction layer packets (TLPs) to a completion queue of a host device, wherein a last TLP includes a uses unordered input output memory write (UIOMWr); and send an interrupt to the host device after receiving an acknowledgement of the last TLP. Other TLPs do not include UIOMWr. Interrupts are not sent to the host device after the other TLPs. The controller is configured to send multiple UIOMWr completions with different tag values. The counter and the tag are different based on an MSIX vectors. The controller is further configured to support a plurality of completion queues (CQs). The controller is further configured to support a same number supported tag values as a same number of the MSX vectors.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
send a nonvolatile memory express (NVMe) completion to a host device, wherein the NVMe completion has a tag, the tag being assigned to two or more completion queues of the host device;
send multiple NVMe completions to a same completion queue of the two or more completion queues utilizing multiple transaction layer packets (TLPs), wherein other TLPs of the multiple TLPs excluding a last TLP of the multiple TLPs do not use unordered input output memory write (UIOMWr);
receive a peripheral component interconnect express (PCIe) completion from the host device, wherein the PCIe completion has the tag; and
send an interrupt to the host device.

2. The data storage device of claim 1, wherein the tag is an indication of which message signaled interrupts extended (MSIx) or message signaled interrupt (MSI) or interrupt extended (INTx) to utilize.

3. The data storage device of claim 1, wherein the NVMe completion is for a first completion queue of the two or more completion queues and the PCIe completion is for the first completion queue.

4. The data storage device of claim 1, wherein the controller uses UIOMWr to write the NVMe completion.

5. The data storage device of claim 4, wherein the controller is configured to send multiple UIOMWr completions with the same tag as the NVMe completion tag.

6. The data storage device of claim 1, wherein the controller is configured to increase a counter when sending the NVMe completion.

7. The data storage device of claim 6, wherein the controller is configured to decrease the counter when receiving the PCIe completion.

8. The data storage device of claim 7, wherein the sending an interrupt is performed when the counter reaches 0 after being decreased to 0.

9. The data storage device of claim 1, wherein the interrupt is sent after multiple PCIe completions have been received for a same completion queue.

10. The data storage device of claim 1, wherein the last TLP of the multiple TLPs uses UIOMWr.

11. A data storage device, comprising:
a memory device; and
a controller coupled to the memory device, wherein the controller is configured to:
send a first device completion notification to a completion queue of a host device;
send a second device completion notification to the completion queue of the host device, wherein the second device completion notification is sent prior to receiving a first host completion notification from the host device for the first device completion notification;
maintain a counter for completion notifications, wherein the counter is increased when sending each device completion notification, and wherein the counter is decreased when receiving each host completion notification; and send an interrupt to the host device, wherein the interrupt is sent after receiving a second host completion notification from the host device for the second device completion notification, wherein the interrupt is sent when the counter is 0 after being decreased to 0.

12. The data storage device of claim 11, wherein the interrupt is an message signaled interrupts extended (MSIx) interrupt, a message signaled interrupt (MSI) interrupt, or an interrupt extended (INTx) interrupt.

13. A data storage device, comprising:

means to store data; and a controller coupled to the means to store data, wherein the controller is configured to:

send multiple transaction layer packets (TLPs) to a completion queue of a host device, the completion queue being assigned to a tag, wherein a last TLP of the multiple TLPs includes a uses unordered input output memory write (UIOMWr), and wherein other TLPs of the multiple TLPs excluding the last TLP do not include UIOMWr; and send an interrupt to the host device after receiving an acknowledgement of the last TLP based on the last TLP having the UIOMWr.

14. The data storage device of claim 13, wherein interrupts are not sent to the host device after the other TLPs.

15. The data storage device of claim 13, wherein the controller is configured to send multiple UIOMWr completions with different tags.

16. The data storage device of claim 13, wherein the controller is configured to increase a counter when completions are sent, and decrease the counter when the controller determines that a host completion response has been received, and wherein a counter and a tag are different based on an message signaled interrupts extended (MSIx) vectors.

17. The data storage device of claim 13, wherein the controller is further configured to create a plurality of completion queues (CQs).

* * * * *